United States Patent
Koo et al.

(10) Patent No.: US 7,327,709 B2
(45) Date of Patent: Feb. 5, 2008

(54) DATA TRANSMITTING AND RECEIVING METHOD IN A MOBILE COMMUNICATION SYSTEM

(75) Inventors: Chang-Hoi Koo, Songnam-shi (KR); Dong-Seek Park, Suwon-shi (KR); Dae-Gyun Kim, Taegu-Kwangyokshi (KR); Beom-Sik Bae, Suwon-shi (KR)

(73) Assignee: Samsung Electronics Co., Ltd (KR)

( * ) Notice: Subject to any disclaimer, the term of this patent is extended or adjusted under 35 U.S.C. 154(b) by 986 days.

(21) Appl. No.: 10/190,790

(22) Filed: Jul. 8, 2002

(65) Prior Publication Data

US 2003/0039224 A1    Feb. 27, 2003

(30) Foreign Application Priority Data

Jul. 7, 2001    (KR) ............................... 2001-40701

(51) Int. Cl.
H04B 7/216    (2006.01)
(52) U.S. Cl. ..................... 370/335; 370/469; 714/748
(58) Field of Classification Search .................... None
See application file for complete search history.

(56) References Cited

U.S. PATENT DOCUMENTS

| | | | |
|---|---|---|---|
| 4,939,731 A | | 7/1990 | Reed et al. |
| 5,918,002 A | * | 6/1999 | Klemets et al. ............... 714/18 |
| 6,240,094 B1 | | 5/2001 | Schneider |
| 6,792,470 B2 | * | 9/2004 | Hakenberg et al. .......... 709/232 |
| 6,956,855 B1 | * | 10/2005 | Chang ......................... 370/394 |
| 7,032,153 B1 | * | 4/2006 | Zhang et al. ................ 714/749 |
| 7,035,894 B2 | * | 4/2006 | Park et al. ................... 709/200 |

FOREIGN PATENT DOCUMENTS

| | | |
|---|---|---|
| EP | 0 964 534 | 12/1999 |
| EP | 1 018 816 | 7/2000 |
| EP | 1 211 838 | 6/2002 |
| WO | WO 99/23844 | 5/1999 |
| WO | WO 00/05911 | 2/2000 |
| WO | WO 02/091633 | 11/2002 |

OTHER PUBLICATIONS

Jalali et al., "Data Throughput of CDMA-HDR a High Efficiency-High Data Rate Personal Communication Wireless System", 2000 IEEE, pp. 1854-1858.

(Continued)

*Primary Examiner*—Brian Nguyen
(74) *Attorney, Agent, or Firm*—The Farrell Law Firm, PC (57) ABSTRACT

A PLP transmitting method in a mobile communication system is provided. A base station determines a forward data rate according to DRC information received from a mobile station, reads out temporary EPs of a maximum total size from the buffers, determines whether the temporary EPs can be transmitted at the data rate, forms a combination of logical EPs from the temporary EPs if the temporary EPs can be transmitted at the data rate and the total size of the temporary EPs is equal to or greater than a threshold, and transmits the logical EPs in a PLP.

18 Claims, 9 Drawing Sheets

OTHER PUBLICATIONS

Qiu et al., "Performance Enhancement of Incremental Redundancy in Wireless Data Networks by Measurement-Based Transmission Control", 1999 IEEE, pp. 517-522.

European Search Report dated Sep. 4, 2003 issued in a counterpart application, namely Appln. No. 02014935.7.

Youngsup Kim et al., "An Adaptive Hybrid ARQ Scheme Using Shortened Codes", 1996 IEEE, pp. 2157-2161.

Pau Bender et al., "CDMA/HDR: A Bandwidth-Efficient High-Speed Wireless Data Service For Nomadic Users", IEEE Communications Magazine, Jul. 2000, pp. 70-77.

* cited by examiner

DATA TRANSMITTING AND RECEIVING METHOD IN A MOBILE COMMUNICATION SYSTEM

PRIORITY

This application claims priority to an application entitled "Data Transmitting and Receiving Method in a Mobile Communication System" filed in the Korean Industrial Property Office on Jul. 7, 2001 and assigned Serial No. 2001-40701, the contents of which are hereby incorporated by reference.

BACKGROUND OF THE INVENTION

1. Field of the Invention

The present invention relates generally to initial data transmission and data retransmission in a CDMA (Code Division Multiple Access) mobile communication system, and in particular, to a method of initial data transmission and data retransmission to ensure high data rate for the provisioning of multimedia service in a mobile communication system.

2. Description of the Related Art

1× EV-DO (Evolution-Data Only) is a high data rate transmission system based on the Qualcomm's HDR (High Data Rate) technology. This mobile communication system transmits data blocks in time division at a predetermined data rate. The data blocks are channel-encoded to minimize errors that may be generated during transmission on a radio channel and transmitted by HARQ (Hybrid Automatic ReQuest) to maximize reception performance. Although the length of a data block is determined according to the data rate, if an initially transmitted data block has errors, a data block of the same size should be retransmitted so that a receiver can recover the defective data block by combining and decoding. In 1× EV-DO and 1× EV-DV (Evolution-Data and Voice), data block sizes depend on data rates. Therefore if an initially transmitted data block has errors and a given data rate for retransmission does not support the size of the initially transmitted data block, a transmitter should retransmit a long data block at a low data rate determined as downing or a data block at a high data rate determined as increasing. Such retransmission method results in an increased error probability, namely retransmission probability, and large radio resource consumption, thereby deteriorating the system performance.

SUMMARY OF THE INVENTION

It is, therefore, an object of the present invention to provide a method of dynamically controlling initial data transmission to ensure reliable data retransmission in a high data rate mobile communication system.

It is another object of the present invention to provide a method of providing multimedia service and supporting both synchronous and asynchronous data retransmission in a mobile communication system.

It is a further object of the present invention to provide a method of multiplexing data traffics having different QoS for transmission.

It is still another object of the present invention to provide a method of receiving multiplexed service data traffics at a receiver.

It is yet another object of the present invention to provide a method of retransmitting multiplexed service data traffics.

To achieve the above and other objects, a base station in a mobile communication system determines a forward data rate according to DRC information received from a mobile station, reads out temporary EPs of a maximum total size from the buffers, determines whether the temporary EPs can be transmitted at the data rate, forms a combination of logical EPs from the temporary EPs if the temporary EPs can be transmitted at the data rate and the total size of the temporary EPs is equal to or greater than a threshold, and transmits the logical EPs in a PLP.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The terms used herein, "forward" means a direction from a base station (BS) to a mobile station (MS) and "reverse" means a direction from the MS to the BS.

In general, a BS schedules MSs within its cell by maximum C/I scheduling or dynamic Round-Robin scheduling. It may adopt scheduling passing at retransmission.

Figure 1:
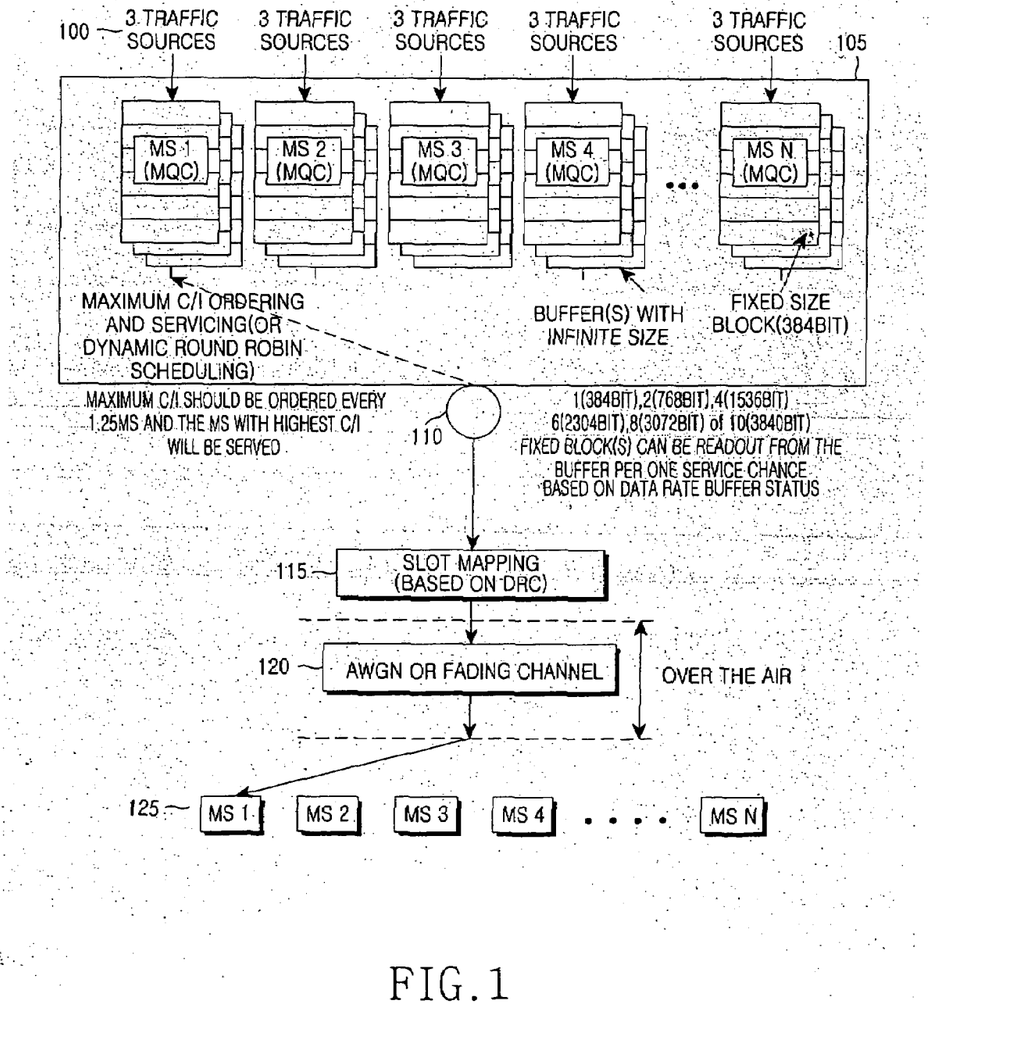
FIG. 1 illustrates a layered protocol architecture in a 1× EV-DV system referred to for describing maximum C/I (Carrier to Interference ratio) scheduling and Round-Robin scheduling which are based on C/I measurements.

Referring to FIG. 1, reference numeral 100 denotes the arrival of application services in the BS. Here three application services (traffic sources) are destined for each MS within the cell. The three services may have the same QoS (Quality of Service) or different QoS. In the case of different QoS, the BS may assign buffers to the individual application services to appropriately process them.

Reference numeral 105 denotes processing of the three application services in three assigned buffers. Each buffer serves as one MQC (Multiple Quality Control) channel. In other words, three MQC channels are assigned to each MS. The BS transmits one or more TUs (Transport Units) in a single PLP (Physical Layer Packet) according to a data rate. If 20 MSs exist within the cell, the BS assigns at least 20 buffers to the whole MSs. Each application service data is segmented in the unit of 384 bits and stored in each buffer. The 384-bit data unit is defined to be a TU. Although the real size of a data unit stored in each buffer is larger than 384 bits considering a header and tail to be added to each TU, it is assumed that the TU has its header and tail in addition to the 384-bit payload. Or the TU can be constructed to be 384 bits with the header and tail included. In this case, the payload is shorter than 384 bits. For transmission, each TU is encoded to form an encoder packet (EP). Thus a TU has a different size according to a code rate after encoding. Unless otherwise specifically denoted, the EP and the TU are used in the same sense except that the former involves encoding. The TU can be converted to an EP before or after buffering in the present invention. The number of TUs read out from each buffer is determined according to a predetermined data rate.

A server 110 reads out a different number of TUs from each buffer according to the data rate. That is, the server 110 reads out one, two, four, six, eight or ten TUs from each buffer to form a PLP. One or more TUs are mapped to a single PLP. The TUs are from the same buffer or different buffers.

Reference numeral 115 denotes constructing a PLP with the TUs according to a data rate determined from DRC (Data Rate Control) information received from an MS and mapping the PLP to slots of a physical channel. The PLP is transmitted in slots of which the number varies according to the data rate and the capacity of the traffic channel. In other words, the TUs are mapped to 1.25-ms slots according to the PLP size and the data rate. Slot mapping will be described later.

Reference numeral 120 denotes slot transmission. A transmission channel may be modeled as an AWGN (Additive White Gaussian Noise) channel or a fading channel. Channel characteristic are generally known to those skilled in the technological art, and therefore, a detailed description of a channel is not provided here.

Reference numeral 125 denotes MSs that receive the application service data from a BS. While the application service data may be transmitted in a different manner in real implementation according to the number of MSs within the cell and the number of application services, the difference is negligible from a view of the whole operation of the transmission apparatus.

A description will be made of scheduling the MSs when three traffic sources are destined for each MS as illustrated in FIG. 1.

(1) Maximum C/I Scheduling

A BS schedules its transmission by ordering the C/I measurements of the MSs and only an MS with a maximum C/I is allowed to receive data. Although the C/Is of the MSs should be measured every 1.25 ms, an MS to receive data may be determined according to the C/I measurements after a certain transmission in real implementation.

(2) Static Round-Robin Scheduling

The MSs are serviced in a predetermined order according to their C/I measurements. This scheduling method is applied only to the AWGN channel.

(3) Dynamic Round-Robin (Static Maximum C/I) Scheduling

The MSs are serviced in a predetermined order according to their C/I measurements as the static Round-Robin scheduling, but the transmission order is changed dynamically. If 20 MSs exist within a cell, the MSs are scheduled according to their C/I measurements. After the last MS is serviced, the transmission order is reset according to their new C/I measurements.

(4) Scheduling Passing

Scheduling passing occurs only at retransmission. In retransmitting an EP, a data rate that does not support the size of the EP may be given. In this case, the EP is not retransmitted but excluded from scheduling. The EP may be transmitted at the next scheduling. If a given data rate does not satisfy the size of the EP again, the EP waits until a data rate sufficient for the EP is determined.

The present invention provides a method of increasing retransmission performance using the above scheduling methods in the context of a 1× EV-DV system under current discussion. Table 1 below illustrates the relationship between forward data rates and EPs (i.e., data blocks) in the current 1× EV-DV system.

TABLE 1

| Data Rate [Kbps] | EP = 3840 bits Number of slots per sub-packet | EP = 3072 bits Number of slots per sub-packet | EP = 2304 bits Number of slots per sub-packet | EP = 1536 bits Number of slots per sub-packet | EP = 768 bits Number of slots per sub-packet | EP = 384 bits Number of slots per sub-packet |
|---|---|---|---|---|---|---|
| 38.4 | N/A | N/A | N/A | N/A | N/A | 8 |
| 76.8 | N/A | N/A | N/A | N/A | 8 | 4 |
| 153.6 | N/A | N/A | N/A | 8 | 4 | 2 |
| 230.4 | N/A | N/A | 8 | N/A | N/A | N/A |
| 307.2 | N/A | 8 | N/A | 4 | 2 | 1 |
| 384 | 8 | N/A | N/A | N/A | N/A | N/A |
| 460.8 | N/A | N/A | 4 | N/A | N/A | N/A |
| 614.4 | N/A | 4 | N/A | 2 | 1 | N/A |
| 768 | 4 | N/A | N/A | N/A | N/A | N/A |
| 921.6 | N/A | N/A | 2 | N/A | N/A | N/A |
| 1228.8 | N/A | 2 | N/A | 1 | N/A | N/A |
| 1536 | 2 | N/A | N/A | N/A | N/A | N/A |
| 1843.2 | N/A | N/A | 1 | N/A | N/A | N/A |
| 2457.6 | N/A | 1 | N/A | N/A | N/A | N/A |
| 3072 | 1 | N/A | N/A | N/A | N/A | N/A |

The BS determines a data rate according to a C/I received from an MS and then the total size of EPs to be transmitted according to the data rate. If a data rate is 38.4 Kbps, an available total EP size is 384 bits and eight slots are assigned to a 384-bit PLP. At a data rate of 307.2 Kbps, available total EP sizes are 3072 bits (eight slots), 1536 bits (four slots), 768 bits (two slots), and 384 bits (one slot). According to the amount of data stored in buffers, a corresponding total EP size is selected.

In Table 1, each data rate does not support certain total EP sizes. If the amount of data in the buffers for an MS does not satisfy a given data rate, the data rate is changed by an ADR (Aggressive Data Rate) or DRD (Data Rate Down) operation. In the present invention, the BS transmits data to an MS in logical EPs according to its size. 3072-bit, 2304-bit, 1536-bit, 768-bit and 384-bit EPs from a buffer are referred to as logical EPs. A PLP is formed out of one or more logical EPs. The logical EP-based PLP formation increases retransmission performance.

Logical EPs according to the present invention are listed in Table 2. The BS initially transmits logical EPs in combination according to an available data block size at a given data rate.

TABLE 2

| Total transmittable EP size | First logical EP combination (Rate Set 1) | Second logical EP combination (Rate Set 2) |
| --- | --- | --- |
| 3840 bits | 3072 + 768 | 2304 + 1536 |
| 3072 bits | 2304 + 768 | 1536 + 1536 |
| 2304 bits | 1536 + 768 | 1536 + 768 |
| 1536 bits | N/A | N/A |
| 768 bits | N/A | N/A |
| 384 bits | N/A | N/A |

Hereinbelow, data transmission based on Table 2 according to the present invention will be compared with conventional data transmission.

Conventional Data Transmission

When a given data rate for retransmission does not support the total size of initially transmitted logical EPs, they are retransmitted at an increased data rate by ADR irrespective of their priority levels. For example, if two 1536-bit logical EPs are initially transmitted at a data rate of 2.4576 Mbps, have errors, and a data rate for retransmission is 38.4 Kbps, the two logical EPs are retransmitted at a minimum data rate (i.e., 307.2 Kpbs) that supports transmission of both logical EPs. In this case, the FER (Frame Error Rate) is equivalent to the FER of transmission of 3072 bits at 38.4 Kbps. According to the conventional data retransmission method, a full aggressive data rate is adopted in order to ensure the total size of initially transmitted EPs at a retransmission and the FER in the retransmission at 307.2 Kbps is an FER involved with transmitting 3072 bits duration eight slots based on a C/I measured at 38.4 Kbps. Therefore, the transmission of logical EPs at 307.2 Kbps increased from 38.4 Kbps increases an error probability.

Data Transmission in One Aspect of the Present Invention

SADR (Semi-Aggressive Data Rate) according to the present invention is available to the case where two or more logical EPs are initially transmitted in a PLP and a current data rate for retransmission does not support one-time retransmission of at least two of the logical EPs. According to SADR, two traffic sources having different QoS are ordered for retransmission according to their priority levels. If two logical EPs are from the same traffic source, have errors, and are subject to ADR for retransmission, only a logical EP supported at an ADR near to the given data rate for retransmission is retransmitted irrespective of their priority levels. The remaining logical EPs are retransmitted at the next scheduling. To render the SADR feasible, at least two logical EPs are combined in an initial transmission PLP, such as rate set 1 and rate set 2 in Table 2.

Before describing the present invention, a conventional data transmission method will first be described with reference to FIG. 2.

Figure 2:
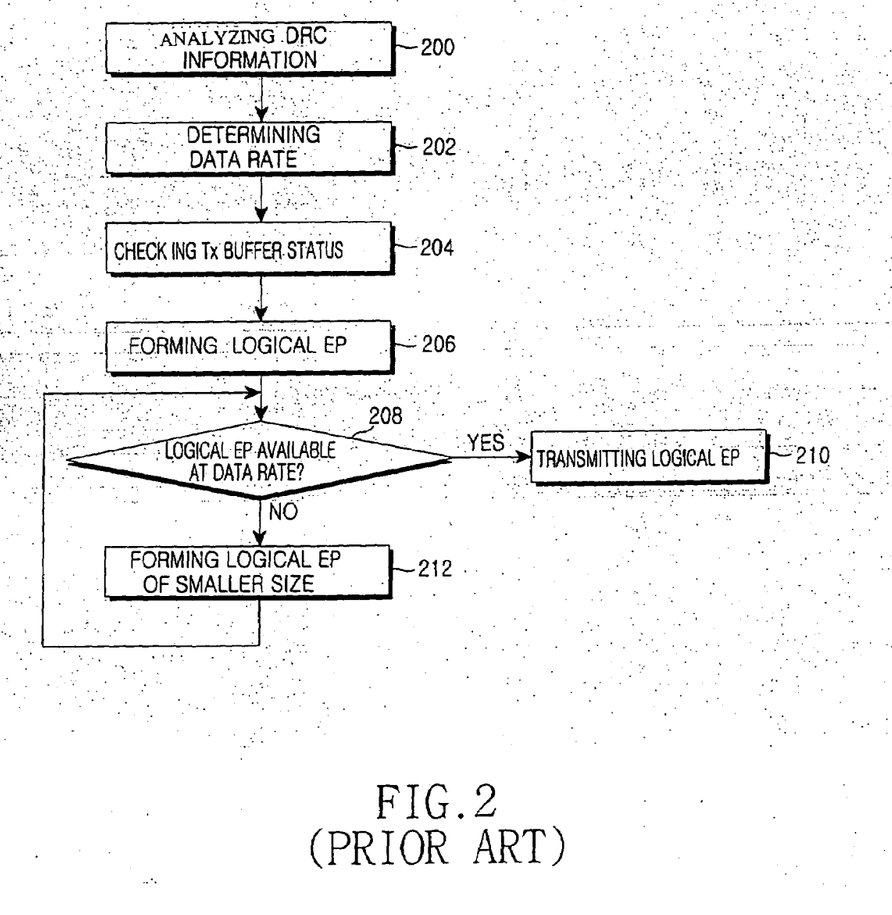
FIG. 2 is a flowchart illustrating initial forward data transmission in a conventional 1× EV-DV system.

FIG. 2 is a flowchart illustrating initial data transmission on the forward link in a conventional 1× EV-DV system. Referring to FIG. 2, upon receipt of DRC information from an MS in step 200, the BS determines a forward data rate for the MS in step 202. The MS generates the DRC information using the C/I of a pilot channel or a data traffic channel from the BS and transmits it to the BS periodically. In step 204, the BS checks the amount of data in transmission (Tx) buffers for the MS. The BS then forms logical EPs with the buffered data in step 206.

The BS determines whether the current data rate supports the total size of the logical EPs in step 208. If it does, the BS transmits the logical EPs in step 210. On the other hand, if the total size of the logical EPs is not available at the data rate, logical EPs of which the total size is one unit smaller are formed in step 212 and returns to step 208.

Figure 3:
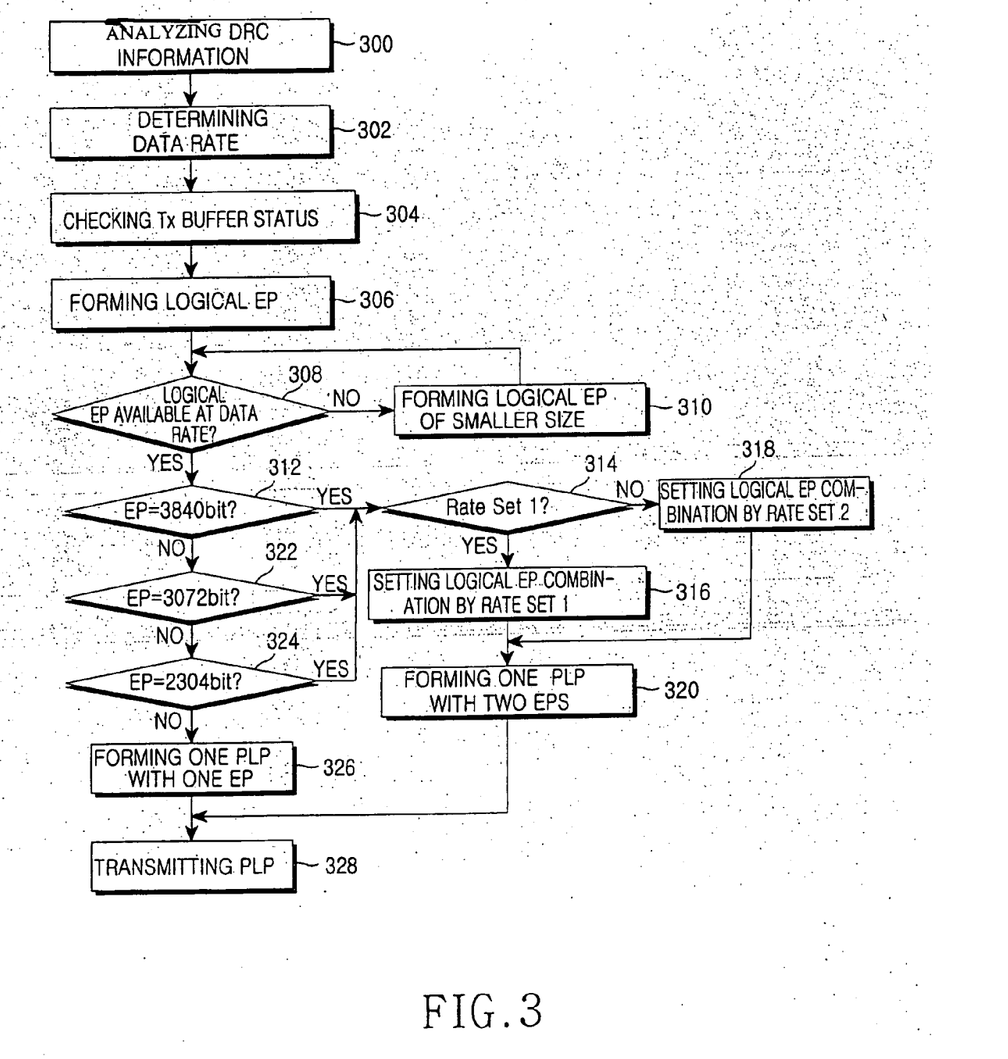
FIG. 3 is a flow chart illustrating SADR-based initial EP transmission at a predetermined data rate in a BS according to the present invention.

FIG. 3 is a flowchart illustrating SADR-based logical EP transmission according to the present invention. Referring to FIG. 3, upon receipt of DRC information from the MS in step 300, the BS determines a forward data rate for the MS in step 302. The MS generates the DRC information using the C/I of a pilot channel or a data traffic channel from the BS and transmits it to the BS periodically. In step 304, the BS checks the amount of data in the Tx buffers for the MS. The BS then forms temporary EPs with the buffered data in step 306. The temporary EPs may be constructed before or after the data rate is determined. Steps 302 to 306 will be described later in more detail.

The BS determines whether the current data rate supports a total temporary EP size in step 308. If it does, the BS goes to step 312. Otherwise, the BS forms temporary EPs of a size one unit smaller than the current temporary EPs in step 310 IQ and then returns to step 308. Steps 308 and 310 are repeated until temporary EPs with a total size satisfying the current data rate are formed.

In step 312, the BS determines whether the total temporary EP size is 3840 bits. If it is 3840 bits, the BS determines whether Rate Set 1 is available for setting a logical EP combination in step 314. If Rate Set 1 is available, the BS sets the logical EP combination according to Rate Set 1 in step 316. On the other and, if Rate Set 2 is available, the BS sets the logical EP combination according to Rate Set 2 in step 318. If data is read out from one buffer, the data may be segmented into two logical EPs according to Rate Set 1 or Rate Set 2. If the data is read out from two buffers, the data may be formed into two logical EPs according to the size of the data in Table 2. Then the BS forms a PLP with the two logical EPs in step 320 and transmits it to the MS in step 328.

Meanwhile, if the total temporary EP size is not 3840 bits in step 312, the BS determines whether it is 3072 bits in step 322. If it is, the BS forms a PLP in steps 314 to 320. If the total temporary EP size is neither 3072 bits nor 2304 bits in steps 322 and 324, the BS forms a PLP out of one of the logical EPs in step 326 and transmits it to the MS in step 328.

In Table 2, one PLP may be formed out of two logical EPs when the size of data read out from the Tx buffers is at least 2304 bits. Further, three or more logical EPs may form a PLP according to the types of logical EPs and the total size of the logical EPs. Although a transmittable total EP size is set to be at least 2304 bits in Table 2, it need not be limited to such.

For better understanding of the present invention only, the following description is made on the premise that one PLP is formed out of two logical EPs and the transmittable total size of the logical EPs for transmission is limited.

Figure 4:
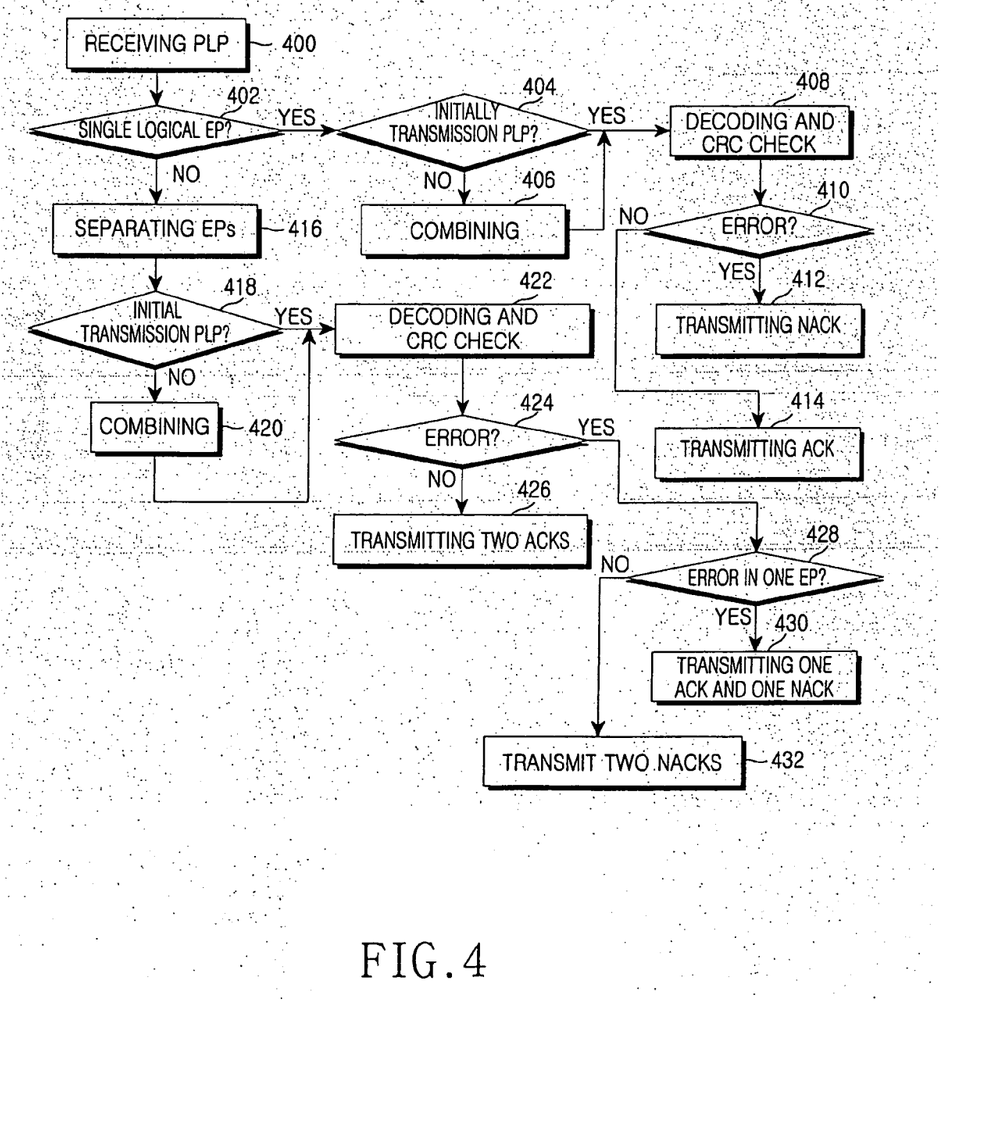
FIG. 4 is a flowchart illustrating reception of SADR-based EPs in an MS according to the present invention.

FIG. 4 is a flowchart illustrating reception of SADR-based logical EPs according to the present invention. It is assumed that the MS is on a receiving side.

Referring to FIG. 4, upon receipt of a PLP in step 400, the MS determines whether the PLP includes one logical EP in step 402. If it does, the MS determines whether the PLP is initially received or re-received in step 404. In the case of an initial transmission PLP, the MS goes to step 408 and in the case of a retransmission PLP, it goes to step 406. In step 406, the MS combines a corresponding initial transmission PLP with the received PLP and then goes to step 408.

In step 408, the MS checks the CRC of the received or combined PLP after decoding. The MS determines whether the PLP has errors in step 410. If it does, the MS transmits a NACK signal for the single logical EP in the PLP to the BS in step 412. Otherwise, the MS transmits an ACK signal for the single logical EP to the BS in step 414.

Meanwhile, if the PLP includes two logical EPs in step 402, the MS separates the logical EPs in step 416 and determines whether the logical EPs are initial transmission logical EPs or retransmission logical EPs in step 418. In the case of initial transmission logical EPs, the MS goes to step 422 and in the case of retransmission logical EPs, it combines the received logical EPs with their respective initial transmission EPs in step 420.

The MS decodes and CRC-checks the logical EPs separately in step 422 and determines whether the logical EPs have errors in step 424. If neither of them has errors, the MS transmits two ACK signals for the logical EPs to the BS in step 426. If errors are found in the logical EPs, the MS determines whether one of the logical EPs has errors in step 428. If it does, the MS transmits to the BS one ACK signal for the normal logical EP and one NACK for the defective logical EP in step 430. If both logical EPs have errors, the MS transmits two NACK signals for the defective logical EPs to the BS in step 432.

While reception of one or two logical EPs in a PLP has been described about the control operation illustrated in FIG. 4, a PLP including three or more logical EPs may be processed in the same manner.

Figure 5:
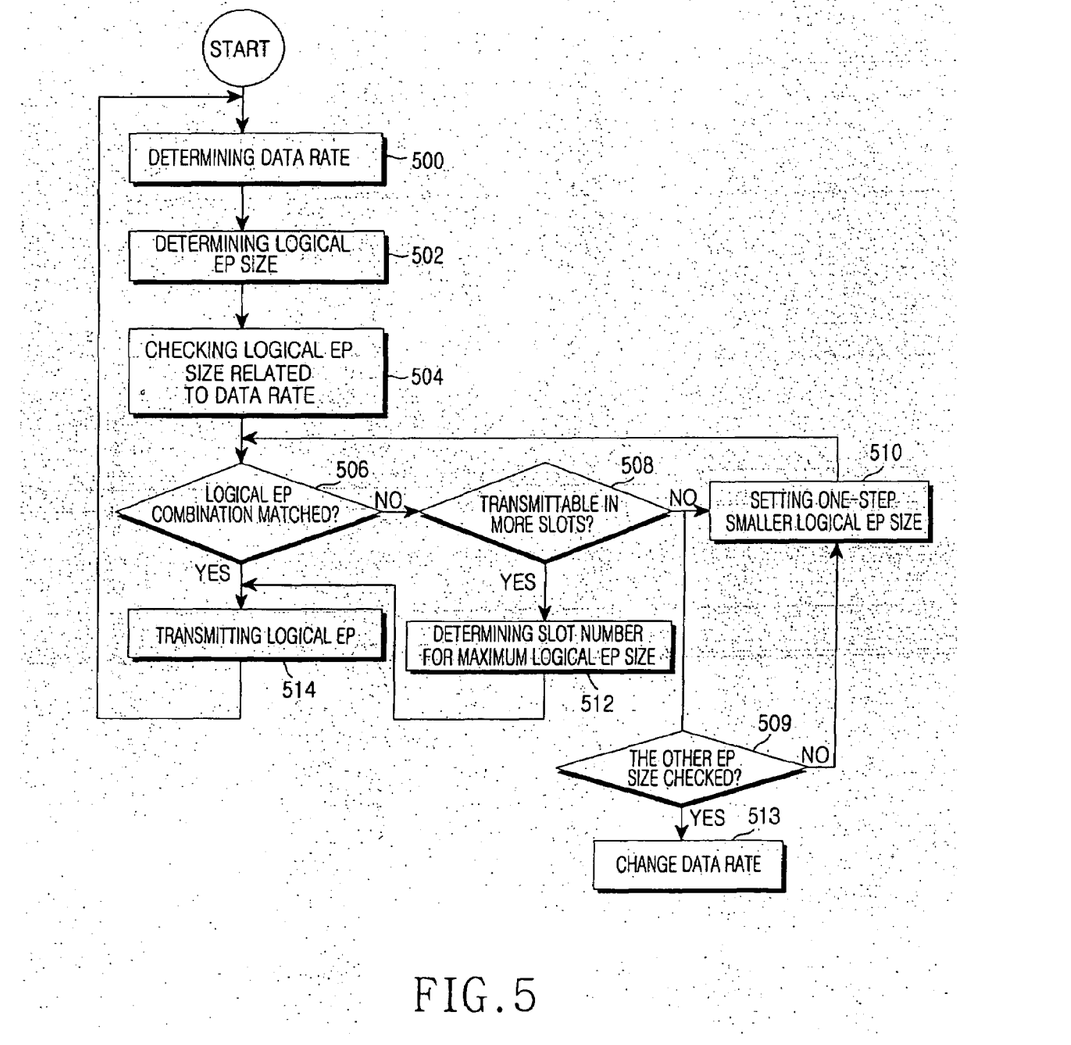
FIG. 5 is a flowchart illustrating selection of logical EPs and a forward data rate according to the present invention.

FIG. 5 is a flowchart illustrating selection of logical EPs and a data rate for forward link transmission according to the present invention. Referring to FIG. 5, the BS determines a data rate from DRC information received from the MS in step 500 and determines the total size of temporary EPs according to the amount of data in the Tx buffers for the MS in step 502. Steps 500 and 502 are performed independently. That is, a maximum transmittable total temporary EP size is determined according to the amount of the buffered data without considering the data rate. The temporary EPs are formed in a way of minimizing padding. That is, no padding is performed with the exception of a 384-bit logical EP. The total temporary EP size is less than or equal to the amount of data stored in the buffers.

Figure 6:
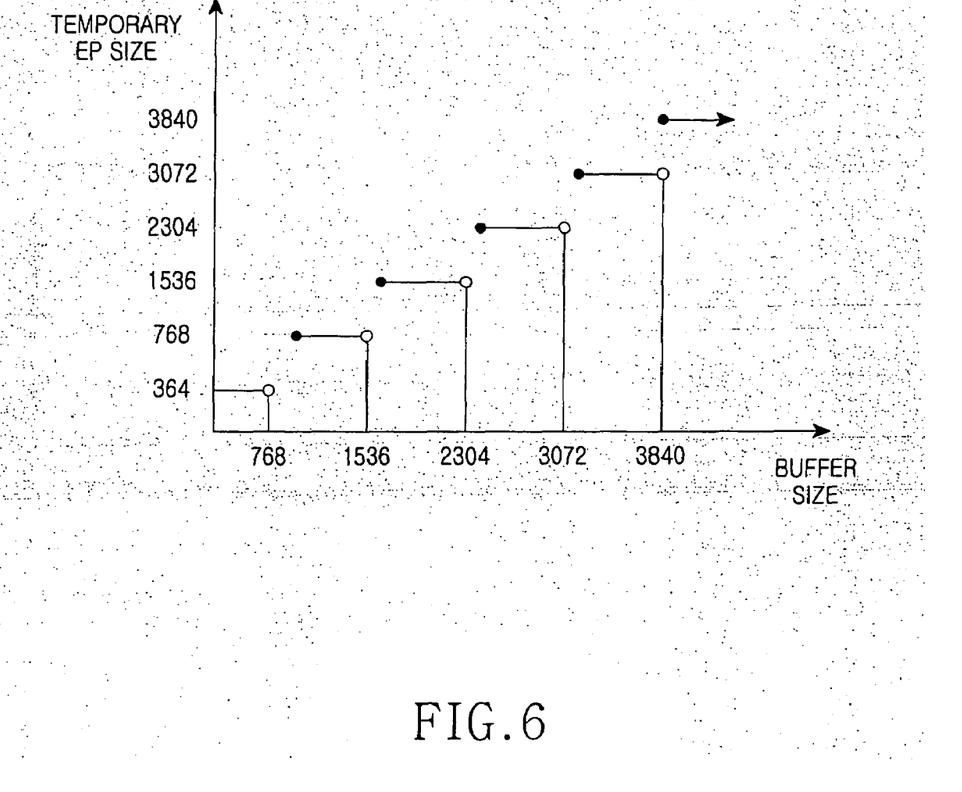
FIG. 6 illustrates the relationship between a total temporary EP size and a buffer size to depict EP segmentation according to the present invention.

FIG. 6 illustrates logical EP segmentation to determine the total temporary EP size. Referring to FIG. 6, if the buffered data is less than 768 bits, the total temporary EP size is 384 bits. If the buffered data is equal to or more than 768 bits, and less than 1536 bits, the total temporary EP size is 768 bits. If the buffered data is equal to or more than 3840 bits, the total temporary EP size is 3840 bits.

The BS then refers to Table 1 to check the total temporary EP size transmittable in one slot in relation to the data rate in step 504 and determines whether there is a logical EP combination for the total temporary EP size in Table 2 in step 506. Referring to Table 1, a temporary EP with 384 bits may be transmitted in one slot at 307.2 Kbps and if it has 768 bits, it may be transmitted in one slot at 614.4 Kbps. If the total temporary EP size is 1536 bits, it may be transmitted in one slot at 1228.8 Kbps.

If the condition is satisfied in step 506, the BS forms logical EPs according to the total temporary EP size, constructs a PLP out of the logical EPs according to the data rate, and transmits the PLP to the MS on a physical channel in step 514.

On the other hand, if the condition is not satisfied in step 506, the BS determines whether the total temporary EP size is supported in more slots at the same data rate in step 508. Referring to Table 1, if the current data rate is 614.4 Kbps and the total temporary EP size is 3072 bits, the BS can transmit 768 bits in one slot at 614.4 Kbps. Therefore, the BS considers 614.4 Kbps to be a data rate that does not support temporary EPs with 3072 bits in total. Then the BS determines whether the temporary EPs can be transmitted in more slots at 614.4 Kbps. If the transmission in more slots is possible, the BS goes to step 512 and otherwise, the BS goes to step 509. In step 509, the BS determines whether all the other EP sizes are checked in relation to the data rate. If they are, the data rate is increased or decreased in a predetermined way in step 513. Then, the BS returns to step 504.

Meanwhile, the BS selects a total temporary EP size one unit smaller than the current total temporary EP size in step 510. The BS stores more transmittable EP sizes than listed in Table 2 and when it is impossible to transmit the temporary EPs at a given data rate, the BS selects a one-unit smaller total temporary EP size. Then the BS returns to step 504. In the above procedure, the BS determines the number of slots for a maximum total temporary EP size transmittable in step 512 and proceeds to step 514.

Data retransmission according to the present is performed as follows.

1. Two logical EPs from different traffic sources with the same QoS, two logical EPs from different traffic sources with no QoS set, or two logical EPs from one traffic source.

1-1. When the two initial transmission logical EPs can be retransmitted, they are all retransmitted.

1-2. One of the two initial transmission logical EPs cannot be retransmitted at the current data rate in the following cases.

1-2-1. When the two logical EPs require ADR, a logical EP available at a minimum ADR from the current data rate is first retransmitted. For example, if a 3072-bit logical EP and a 768-bit logical EP are transmitted in a 3840-bit PLP and both logical EPs have errors, and a data rate for retransmission is given as 38.4 Kbps, the data rate should jump four units to 307.2 Kbps to transmit 3072 bits and jump one unit to 76.8 Kbps to transmit 768 bits in Table 1. In this case, the 768-bit logical EP is first retransmitted because it jumps less than the 3072 bit logical EP. Priority is given to a logical EP that does not require data rate jumping rather than a logical EP requiring data rate jumping. If two logical EPs require the same data rate jumping, a longer logical EP is first retransmitted. If a 3072-bit logical EP and a 768-bit logical EP are retransmitted and a data rate for retransmission is determined to be 460.8 Kbps, one-unit data rate jumping is required for both logical EPs. Then the 3072-bit logical EP is first retransmitted. If two logical EPs are of the same size, it does not matter which one is first retransmitted.

1-2-2. The two logical EPs require an ADR and a DRD, respectively in some cases. If a 3072-bit logical EP and a 768-bit logical EP are to be retransmitted and a data rate for retransmission is determined to be 921.6 Kbps, an ADR and a DRD are applied to the former and the latter, respectively. In this case, the DRD has priority over the ADR and thus the 768-bit logical EP is first retransmitted.

1-2-3. The two logical EPs may require a DRD. RegADRless of the number of units to jump down, a longer logical EP is first retransmitted.

2. Two logical EPs from different traffic sources with different QoS.

When a data rate for retransmission supports the two initial transmission logical EPs, they are retransmitted. If both the logical EPs cannot be retransmitted at the data rate, a logical EP with a higher priority level is first retransmitted irrespective of ADR and DRD.

SADR data retransmission according to the present invention will be described with specific examples taken. Since retransmitted logical EPs should be the same in size as initially transmitted logical EPs, an ADR and a DRD are required in some cases. As stated before, an initial transmission PLP includes two logical EPs, by way of example.

Retransmission of Logical EPs in Rate Set 1 a. Two Logical EPs (3072+768) with 3840 Bits in Total

In the case where the two logical EPs are from different traffic sources having different QoS, if both EPs have errors, and can be retransmitted at a given data rate, they are retransmitted together. On the other hand, if one of them has errors, only the defective logical EP is retransmitted by ADR or DRD according to the size of the logical EP and the data rate. If the two logical EPs have errors but cannot be retransmitted at one time, a logical EP with a higher priority level is retransmitted by ADR or DRD.

In the case where the two logical EPs are from the same traffic source or from different traffic sources with the same QoS, if both EPs have errors and can be retransmitted at a given data rate, they are retransmitted together. If the two logical EPs have errors but cannot be retransmitted together, one of them is selected for retransmission taking into account the relationship between ADR and DRD.

b. Two Logical EPs (2304+768) with 3072 Bits in Total.

In the case where the two logical EPs are from different traffic sources having different QoS, if both EPs have errors and a given data rate for retransmission supports transmission of 3072 bits, they are retransmitted together. On the other hand, if one of them has errors, only the defective logical EP is retransmitted by ADR or DRD according to the size of the logical EP and the data rate. If the two logical EPs have errors but cannot be retransmitted at one time, a logical EP with a higher priority level is retransmitted by ADR or DRD.

In the case where the two logical EPs are from the same traffic source or from different traffic sources with the same QoS, if both EPs have errors and can be retransmitted at a given data rate, they are retransmitted together. If one of the two logical EPs has errors, only the defective logical EP is retransmitted at the given data rate or by DRD or ADR. If the two logical EPs have errors but cannot be retransmitted together, one of them is selected for retransmission taking into account the relationship between ADR and DRD.

c. Two Logical EPs (1536+768) with 2304 Bits in Total.

In the case where the two logical EPs are from different traffic sources having different QoS, if both EPs have errors and a given data rate for retransmission supports transmission of 2304 bits, they are retransmitted together. On the other hand, if one of them has errors, only the defective logical EP is retransmitted at the data rate or by ADR or DRD. If the two logical EPs have errors but cannot be retransmitted at one time, a logical EP with a higher priority level is retransmitted by ADR or DRD.

In the case where the two logical EPs are from the same traffic source or from different traffic sources with the same QoS, if both EPs have errors and a given data rate supports transmission of 2304 bits, they are retransmitted together. If one of the two logical EPs has errors, only the defective logical EP is retransmitted at the given data rate or by DRD or ADR. If the two logical EPs have errors but cannot be retransmitted together, one of them is selected for retransmission taking into account the relationship between ADR and DRD.

Retransmission of Logical EPs in Rate Set 2 a. Two Logical EPs (2304+1536) with 3840 Bits in Total

In the case where the two logical EPs are from different traffic sources having different QoS, if both EPs have errors and a given data rate for retransmission supports transmission of 3840 bits, they are retransmitted together. On the other hand, if one of them has errors, only the defective logical EP is retransmitted at the data rate or by ADR or DRD. If the two logical EPs have errors but cannot be retransmitted at one time, a logical EP with a higher priority level is retransmitted at the data rate, or by ADR or DRD.

In the case where the two logical EPs are from the same traffic source, from different traffic sources with the same QoS, or from different traffic sources with no QoS set, if both EPs have errors and a given data rate for retransmission supports transmission of 3840 bits, they are retransmitted together. If one of the two logical EPs has errors, only the defective logical EP is retransmitted. If the two logical EPs have errors but cannot be retransmitted together, one of them is selected for retransmission taking into account the relationship between ADR and DRD.

b. Two Logical EPs (1536+1536) with 3072 Bits in Total.

If both EPs have errors and a given data rate for retransmission supports transmission of 3072 bits, they are retransmitted together. On the other hand, if one of them has errors, only the defective logical EP is retransmitted at the data rate or by ADR or DRD. If both logical EPs have errors and cannot retransmitted together at the data rate, a logical EP with a higher priority level is retransmitted when the logical EPs are from different traffic sources with different QoS, and either of them is retransmitted randomly when the logical EPs are from the same traffic source or from different traffic sources with the same QoS.

c. Two Logical EPs (1536+768) with 2304 Bits in Total.

In the case where the two logical EPs are from different traffic sources having different QoS, if both EPs have errors and a given data rate for retransmission supports transmission of 2304 bits, they are retransmitted together. On the other hand, if one of them has errors, only the defective logical EP is retransmitted at the data rate or by ADR or DRD. If the two logical EPs have errors but cannot be retransmitted at one time, a logical EP with a higher priority level is retransmitted by ADR or DRD.

In the case where the two logical EPs are from the same traffic source, from different traffic sources with the same QoS, or from different traffic sources with no QoS set, if both EPs have errors and a given data rate supports transmission of 2304 bits, they are retransmitted together. If one of the two logical EPs has errors, only the defective logical EP is retransmitted at the given data rate or by DRD or ADR. If the two logical EPs have errors but cannot be retransmitted together, one of them is selected for retransmission taking into account the relationship between ADR and DRD.

Figure 7:
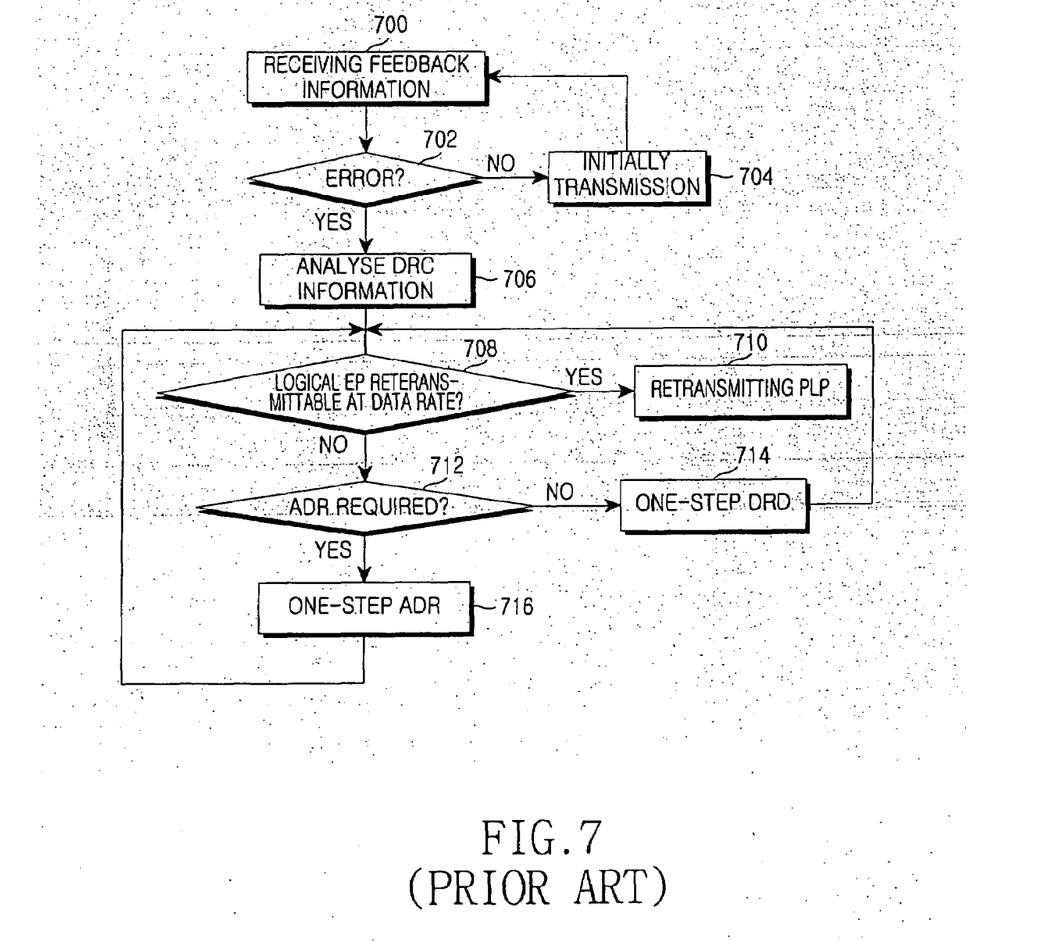
FIG. 7 is a flowchart illustrating conventional EP retransmission at a predetermined data rate in the BS.

FIG. 7 is a flowchart illustrating a conventional logical EP retransmission according to a given data rate in a BS. Referring to FIG. 7, upon receipt of ACK/NACK feedback information about a transmitted PLP from an MS in step 700, the BS determines from the feedback information whether the transmitted PLP has errors in step 702. If the PLP has errors, the BS goes to step 706 and if the PLP has been successfully received at the MS, the BS goes to step 704 for initial transmission of another PLP as depicted in FIG. 2.

In step 706, the BS analyses DRC information received from the MS. As stated before, the MS generates the DRC information according to the C/I of a signal from the BS and transmits it to the BS periodically. The BS determines whether the current data rate supports logical EPs to be retransmitted in step 708. If it does, the BS retransmits the PLP in step 710. On the other hand, if the current data rate does not support retransmission of the logical EPs, the BS determines whether an ADR should be applied in step 712. If the ADR is required, the BS adopts an ADR increased from the current data rate by one unit in step 716 and then returns to step 708. If the ADR is not needed, the BS adopts a DRD decreased from the current data rate by one unit in step 714 and then returns to step 708. In this manner, the logical EPs are retransmitted at an optimum data rate.

Figure 8A:
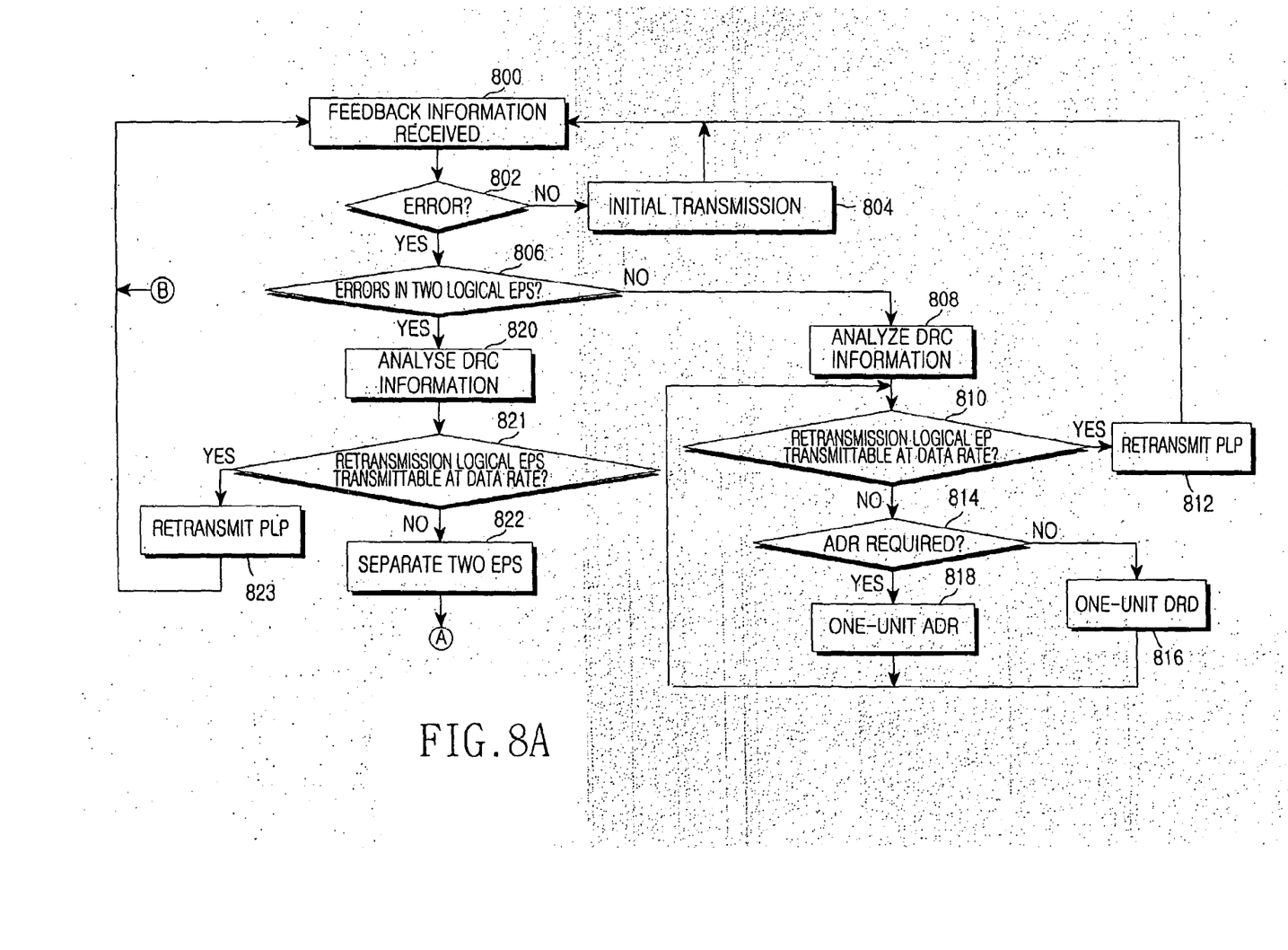
FIGS. 8A and 8B are flowcharts illustrating SADR-based EP retransmission at a predetermined data rate in the BS according to the present invention.
Figure 8B:
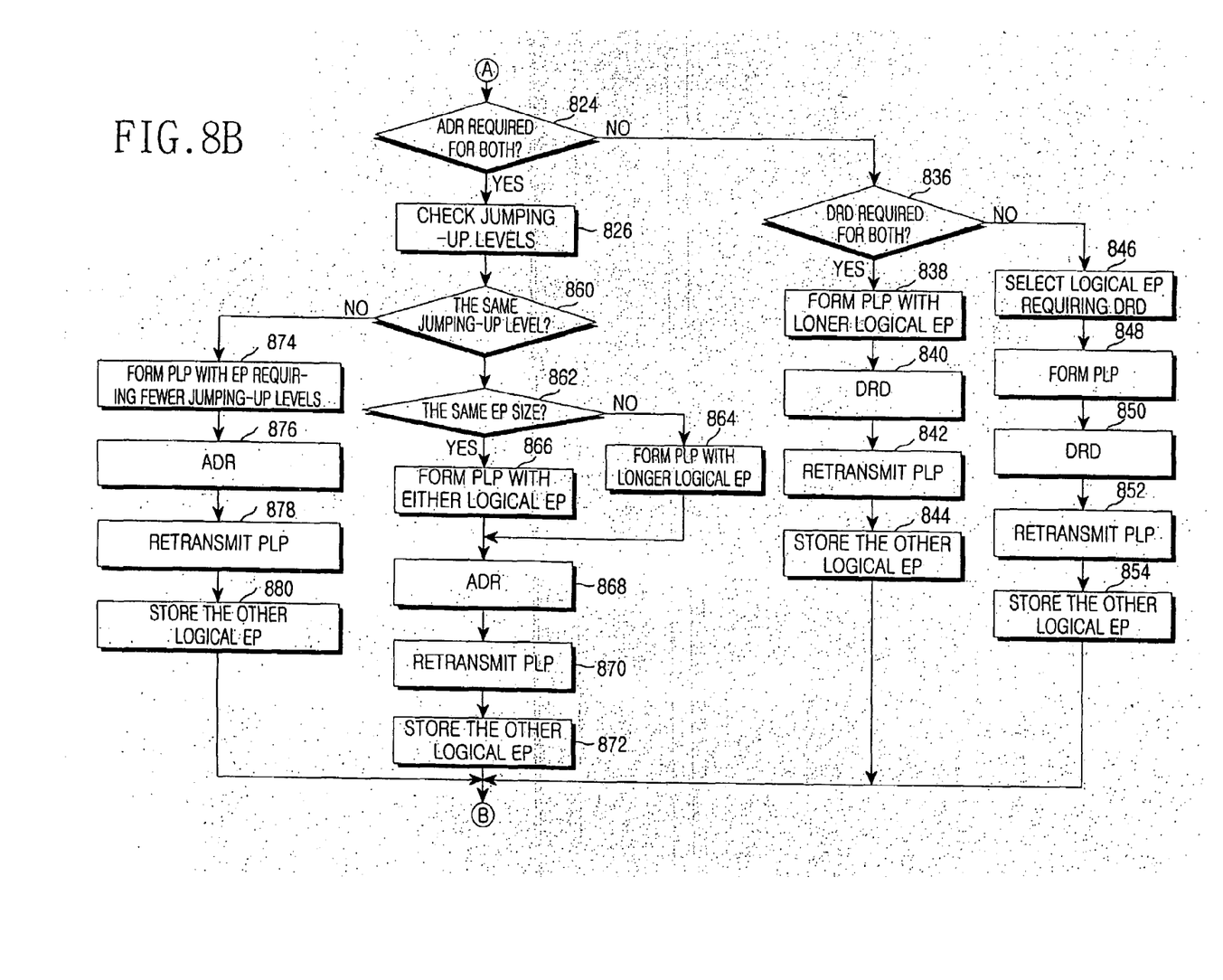

FIGS. 8A and 8B are flowcharts illustrating SADR-based logical EP retransmission in the BS according to the present invention. Referring to FIGS. 8A and 8B, upon receipt of ACK/NACK feedback information about a transmitted PLP from the MS in step 800, the BS determines from the feedback information whether the transmitted PLP has errors in step 802. If the PLP has errors, the BS goes to step 806 and if the PLP has been successfully received at the MS, the BS goes to step 804 for initial transmission of another PLP as depicted in FIG. 3.

The BS determines from the feedback information whether two logical EPs have errors in step 806. In the case of two defective logical EPs, the BS goes to step 820 and otherwise, it goes to step 808. Since it is assumed that an initially transmitted PLP includes two logical EPs according to the present invention, two ACKs/NACKs are received in the feedback information for the PLP. But, the number of logical EPs in a PLP is not limited. Three or more logical EPs form a PLP according to the number of transmitted packets or the number of MQC channels and then as many ACKs/NACKs as the logical EPs may be included in the feedback information.

If one logical EP has errors, the BS analyses DRC information received from the MS in step 808 in order to determine a data rate for retransmission and determines whether the current data rate supports transmission of the defective logical EP to be retransmitted in step 810. If the logical EP can be retransmitted at the current data rate, the BS retransmits a PLP with the logical EP in step 812. On the other hand, if the current data rate does not support transmission of the logical EP, the BS determines whether an ADR is to be adopted in step 814. If the ADR is required, the BS increases the current data rate to a one-unit higher data rate in step 818 and goes to step 810. If the ADR is not required, the BS decreases the current data rate to a one-unit lower data rate in step 816 and then goes to step 810.

If the two logical EPs have errors in step 806, the BS analyses the DRC information in step 820 in order to determine a data rate for retransmission and determines whether the current data rate supports transmission of the two logical EPs in step 821. If it does, the BS retransmits a PLP with the two logical EPs in step 823. On the other hand, if the current data rate is not sufficient for transmission of the logical EPs, the BS separates the two logical EPs from each other in step 822 in order to determine the priority levels of the logical EPs for retransmission.

In step 824, the BS determines whether both logical EPs require ADR. If ADR is not required for both logical EPs, the BS determines whether they require DRD in step 836. If both logical EPs require DRD, the BS goes to step 838 and otherwise, it goes to step 846. Steps 824, 836 and 846 are needed to determine whether the current data rate should be increased or decreased.

The BS determines how many levels the data rate should be increased for the two logical EPs in step 826. If it is determined that the two logical EPs require the same increase of the data rate in step 860, the BS goes to step 862 and otherwise, it goes to step 874.

In step 874, the BS forms a PLP with a logical EP requiring a lower data rate increase. The BS then increases the current data rate to the minimum ADR in step 876 and retransmits the PLP in step 878. The BS then stores a PLP with the other logical EP requiring a higher data rate increase in a retransmission buffer in step 880 and returns to step 800.

Meanwhile, in the case where the two logical EPs require the same increase of the data rate in step 860, the BS determines whether they have the same EP size in step 862. In the case of the same EP size, the BS selects either of the logical EPs randomly in step 866. Then the BS forms a PLP with the selected logical EP, increases the current data rate, and retransmits the PLP in steps 866 to 870. The BS then stores a PLP with the other logical EP in the retransmission buffer in step 872 and returns to step 800.

When the two logical EPs have different EP sizes in step 862, the BS forms a PLP with a longer logical EP in step 864 and performs steps 868, 870 and 872. The stored logical EP is retransmitted with priority at the next scheduling.

In the case where the two logical EPs require DRD in step 836, the BS forms a PLP with a longer logical EP in step 838, decreases the current data rate to a data rate that supports the transmission of the longer logical EP in step 840, and transmits the PLP in step 842. The BS then stores a PLP with the shorter logical EP in the retransmission buffer in step 844 and returns to step 800. The stored logical EP is retransmitted with priority at the next scheduling.

In the case where one of the logical EPs requires ADR and the other logical EP required DRD, the BS forms a PLP with the latter logical EP in step 848, decreases the current data rate to a data rate that supports transmission of the logical EP in step 850, and retransmits the PLP in step 852. In step 854, the BS stores the logical EP requiring the ADR in the retransmission buffer to be used with priority at the next scheduling.

In accordance with the present invention as described above, data is transmitted in the form of separate logical EPs in a PLP at an initial transmission so that only a defective logical EP is retransmitted in a mobile communication system. Therefore, an error probability at a retransmission is reduced.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A PLP (Physical Layer Packet) transmitting method in a base station of a mobile communication system where the base station has a buffer for storing data from each of a plurality of application services, reads out at least one logical EP (Encoder packet) from the buffer, forms a PLP out of the logical EP, and transmits the PLP, and a mobile station receives the PLP, reports whether the logical EP in the PLP has an error, and transmits DRC (Data Rate Control) information to the base station, the method comprising:
- determining a forward data rate according to DRC information received from a mobile station;
- reading out one or more temporary EPs of a maximum total size from one or more buffers;
- determining whether the one or more temporary EPs can be transmitted at the forward data rate;
- forming one or more logical EPs from the one or more temporary BPs if the one or more temporary EPs can be transmitted at the forward data rate and if a total size of the one or more temporary EPs is equal to or greater than a threshold; and
- transmitting the one or more logical EPs in a PLP.

2. The PLP transmitting method of claim 1, wherein if a single temporary EP is read out and a size of the single temporary EP is equal to or greater than the threshold, dividing the single temporary EP into at least two logical EPs for transmission.

3. The PLP transmitting method of claim 1, further comprising:
- reading out a second one of said temporary EPs with a total size smaller than the maximum total size by one unit; and
- determining whether the second read out temporary EP can be transmitted at the forward data rate, if it is impossible to transmit the one or more temporary EPs at the forward data rate.

4. The PLP transmitting method of claim 1, further comprising:
- determining whether at least one of the logical EPs has an error if a signal indicating that the transmitted logical EPs having an error has been received; and
- if it is determined that the at least one of the logical EPs has an error, retransmitting the at least one of the logical EPs determined as having an error, if the at least one of the logical EPs determined as having an error can be retransmitted at a data rate determined from DRC information received from the mobile station.

5. The PLP transmitting method of claim 4, further comprising retransmitting a logical EP with a higher priority level first, if more than one logical EP having an error cannot be retransmitted at the data rate.

6. The PLP transmitting method of claim 4, further comprising:
- determining whether one or more logical EPs having an error require an ADR (Aggressive Data Rate) or a DRD (Data Rate Down), if the one or more EPs having an error have a same priority level and cannot be retransmitted at one time at the data rate; and
- retransmitting a logical EP requiring an ADR most approximate to the data rate first, if more than one logical EP having an error requires an ADR.

7. The PLP transmitting method of claim 6, further comprising transmitting a longest logical EP first, if more than one logical EP having an error requires DRDs.

8. The PLP transmitting method of claim 6, further comprising transmitting a longest logical EP requiring a DRD first, if more than one logical EPs having an error requires DRDs and ADRs.

9. The PLP transmitting method of claim 1, further comprising the step of retransmitting more than one logical EPs according to the priority levels of the logical EPs if the more than one logical EP have an error and cannot be retransmitted.

10. The PLP transmitting method of claim 9, further comprising the step of first retransmitting a logical EP requiring an ADR (Aggressive Data Rate) most approximate to the forward data rate if the more than one logical EPs require ADRs.

11. The PLP transmitting method of claim 10, further comprising the step of first retransmitting the longest logical EP if the more than one logical EPs require the same ADR.

12. The PLP transmitting method of claim 10, further comprising the step of first retransmitting one of the more than one logical EPs that is randomly selected if the more than one logical EPs have the same logical EP size.

13. The PLP transmitting method of claim 9, further comprising the step of first retransmitting a logical EP requiring an ADR (Aggressive Data Rate) most approximate to the forward data rate if the more than one logical EP have an error, cannot be retransmitted at one time at the forward data rate, and require ADRs.

14. The PLP transmitting method of claim 13, further comprising the step of first retransmitting one of the more than one logical EPs that is randomly selected if the more than one logical EPs require the same ADR and have the same logical size.

15. The PLP transmitting method of claim 13, further comprising the step of first retransmitting one of the more than one logical EPs that is randomly selected if the more than one logical EPs require the same ADR and have the same logical EP size.

16. A PLP (Physical Layer Packet) receiving method in a mobile station of a mobile communication system that includes a base station having one or more buffers for storing data of each of a plurality of application services, for reading out at least one logical EP (Encoder packet) from the one or more buffers, forming a PLP from the logical EP, and transmitting the PLP, and the mobile station for receiving the PLP, reporting whether the logical EP in the PLP has an error, and transmitting DRC (Data Rate Control) information to the base station, the method comprising:
- separating one or more logical EPs from a PLP upon receipt of the PLP;
- determining whether the logical EPs are initially received or re-received;
- checking whether each of the logical EPs has an error if the logical EPs are initially received and transmitting a signal indicating a result of the error check to the base station; and
- combining the logical EPs with previously received identical logical EPs if the logical EPs are re-received, checking whether each of the combined logical EPs has an error, and transmitting a signal indicating a result of the error check to the base station.

17. A PAP (Physical Layer Packet) transmitting method in a base station of a mobile communication system where the base station has a buffer for storing data from each of a plurality of applications services, reads out at least one logical EP (Encoder packet) from the buffers, forms a PLP out of the logical EP, and transmits the PLP, and a mobile station received the PLP, reports whether the logical EP in the PLP has an error, and transmits DRC (Data Rate Control) information to the base station, the method comprising the steps of:

determining whether at least two of transmitted logical EPs have an error according to whether signal indicating that the transmitted logical EPs having an error have been received;

if at least two of the logical EPs have an error, determining whether the at least two the logical EPs having an error cannot be retransmitted at one time at a forward date rate determined from DRC information from a mobile station;

retransmitting the at least two logical EPs having an error, if the at least two logical EPs having an error can be retransmitted at one time at the forward data rate; and retransmitting the at least two of the logical EPs having an error according to the priority levels of the logical EPs if the at least two logical EPs having an error cannot be retransmitted at one time at the forward data rate.

18. The PLP transmitting method of claim 17, further comprising the step of retransmitting more than one logical EPs according to the priority levels of the logical EPs if the more than one logical EP have an error and cannot be retransmitted at one time at the forward data rate.

* * * * *